United States Patent [19]

Suzuki et al.

[11] Patent Number: 5,872,671
[45] Date of Patent: Feb. 16, 1999

[54] DISK DRIVE APPARATUS AND READ ERROR RECOVERY PROCEDURE THEREIN

[75] Inventors: Hiroaki Suzuki, Fujisawa; Akira Kibashi, Zama; Yoshio Yamamoto; Hideo Asano, both of Machida, all of Japan

[73] Assignee: International Business Machines Corporation, Armonk, N.Y.

[21] Appl. No.: 683,679

[22] Filed: Jul. 8, 1996

[30] Foreign Application Priority Data

Jul. 13, 1995 [JP] Japan ................................. 7-177101

[51] Int. Cl.⁶ .................................................. G11B 5/58
[52] U.S. Cl. ............................................. 360/75; 360/25
[58] Field of Search ........................... 360/75, 113, 122, 360/128, 129, 25, 73.03, 97

[56] References Cited

U.S. PATENT DOCUMENTS

| | | | |
|---|---|---|---|
| 4,510,541 | 4/1985 | Sasamoto | 360/97 |
| 5,327,311 | 7/1994 | Ananth et al. | 360/103 |
| 5,461,521 | 10/1995 | Ito et al. | 360/75 |
| 5,490,025 | 2/1996 | Dorius et al. | 360/103 |
| 5,527,110 | 6/1996 | Abraham et al. | 360/75 X |
| 5,537,034 | 7/1996 | Lewis | 324/212 |
| 5,612,830 | 3/1997 | Gregory et al. | 360/69 |
| 5,612,839 | 3/1997 | Jacques | 360/103 |
| 5,696,643 | 12/1997 | Tsuwako et al. | 360/73.03 |

OTHER PUBLICATIONS

Webster's II New Riverside University Dictionary, p. 332, 1994.

Primary Examiner—Nabil Hindi
Assistant Examiner—K. Wong
Attorney, Agent, or Firm—Joan Pennington

[57] ABSTRACT

When a sharp change in signal judged due to thermal asperities has appeared, a disk drive apparatus according to the present invention repeats the unidirectional seek operation in a region centered on the belonging cylinder position of the track in which the read error has occurred as one data recovery operation, then scrubs and removes the thermal asperities by putting the component surface around the MR head into positive contact with the asperities, thereby eliminating the fundamental cause of a read error caused by thermal asperities.

8 Claims, 6 Drawing Sheets

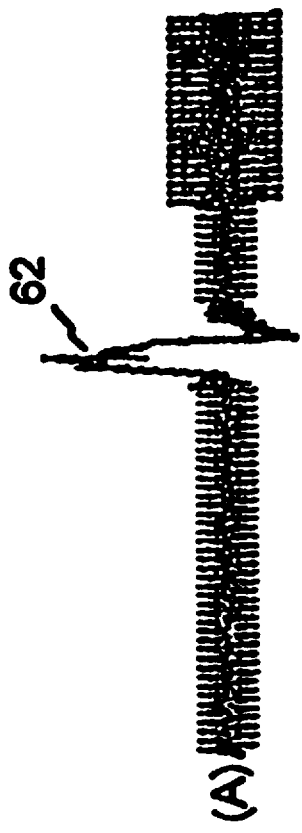
(A) FIG. 4A PRIOR ART
(B) FIG. 4B PRIOR ART

```
REPEAT(4 TIMES)

SEEK TO -5CYL
   WAIT 1 ROTATION
    SEEK TO -4CYL
   WAIT 1 ROTATION
    SEEK TO -3CYL
   WAIT 1 ROTATION
    SEEK TO -2CYL
   WAIT 1 ROTATION
    SEEK TO -1CYL
   WAIT 1 ROTATION
  SEEK TO ORIGINAL CYL
   WAIT 1 ROTATION
    SEEK TO +1CYL
   WAIT 1 ROTATION
    SEEK TO +2CYL
   WAIT 1 ROTATION
    SEEK TO +3CYL
   WAIT 1 ROTATION
    SEEK TO +4CYL
   WAIT 1 ROTATION
    SEEK TO +5CYL
   WAIT 1 ROTATION

END REPEAT
```

FIG.6

DISK DRIVE APPARATUS AND READ ERROR RECOVERY PROCEDURE THEREIN

FIELD OF THE INVENTION

The present invention relates to a disk drive apparatus and more particularly, to a disk drive apparatus capable of eliminating a data read error, specifically a read error attributable to asperities occurring on the surface of a disk, that is thermal asperities and a procedure for resolving such a read error as well.

DESCRIPTION OF THE PRIOR ART

The magnetic disk drive apparatus is an apparatus for recording and reading data on the surface of a disk by impressing a magnetic change. A converter, positioned at a predetermined position of a track on which data are recorded, reads and writes information recorded in a track of the high-speed rotating disk. A head is positioned, slightly apart from the surface of the disk, above a predetermined track. As one of recent converter head, a magnetic resistance (MR) converter head has been adopted, whose output resistance varies with a change in magnetic field. This change in resistance is converted into a swing voltage signal by flowing a predetermined current through the MR element and consequently a read of data is executed.

As one phenomenon to hinder data read, there is a thermal asperity (TA). A thermal asperity is an asperity occurring parasitically on a disk that collides with a head to cause an error. There are cases where a phenomena called thermal asperity elevates a strip temperature to above 100 deg. locally. The cause for this rise in temperature lies in a mechanical collision between the head portion including an MR stripe and asperities on the surface of a disk. Since a change in the resistance of an MR head due to a change in magnetic field caused by a normal read on the medium is less than 1% of the MR stripe resistance, a signal change attributable to a rise in temperature in the occurrence of thermal asperities greatly exceeds a change in resistance due to a normal read signal, so that a normal read of data is hindered.

When reading a sharp change in signal that is conjectured due to thermal asperities, some conventional approaches taken as countermeasure for thermal asperities on read data effects an appropriate modification and alteration on the read signal to make it usable as read data, or others execute a correction of the read signal by an appropriate error correction method such as ECC. However, these have demerits in that the addition of a new external hardware is needed, or in that so great a burst error as non-recoverable may occur even with ECC or such methods, and is finally forced to be processed as unreadable hard error, and consequently cannot serve as a satisfactorily solving method for thermal asperities.

SUMMARY OF THE INVENTION

For solving the above defects in conventional countermeasures for thermal asperities, it is one object of the present invention to provide a disk drive apparatus and method for removing an asperity on the disk that caused thermal asperities when they occurred, thereby recovering an error due to them to be prevented from arising.

To achieve the above object, when detecting a sharp change in signal that is conjectured due to thermal asperities by reading with the MR head for reading signals, or when a data read error occurs, a disk drive apparatus according to the present invention scrubs and removes an asperity by repeating unidirectional seek operations and positively putting the structure surface of the head into contact with the asperity over a region centered the cylinder position of a track where a read error occurred as one data recovery operation.

One arrangement of the present invention causes the MR head to execute a seek operation around the cylinder where a read error occurred, so that the Air Bearing Surface (ABS), the surface around the MR-element, collides with and eliminates an asperity on the disk.

By a positive contact with an asperity on the disk of the signal converter component through a unidirectional seek operation centered on the belonging cylinder where a thermal asperity (TA) occurred, another arrangement of the present invention scrubs the relevant asperity and resolve a read error, wherein the unidirectional seek operation is executed from within +10 tracks to −10 tracks around the track where a read error occurred.

BRIEF DESCRIPTION OF THE DRAWING

The present invention together with the above and other objects and advantages may best be understood from the following detailed description of the preferred embodiments of the invention illustrated in the drawings, wherein:

FIG. 4A is a graph showing a read signal in a disk drive apparatus according to one embodiment of the present invention;

FIG 4B is a graph showing a read signal in a disk drive apparatus according to one embodiment of the present invention;

FIG. 6 is an explanatory drawing of the sequence of the seek operation according to one embodiment of the present invention.

DETAILED DESCRIPTION OF THE PREFERRED EMBODIMENTS

In brief, an advantage of the invention is that in the case of occurrence of an error attributable to thermal asperities, a disk drive apparatus and a method for removing thermal asperities according to the present invention enables asperities as a fundamental cause to be eliminated, thereby compensating a read error and making the data read possible.

Figure 1:
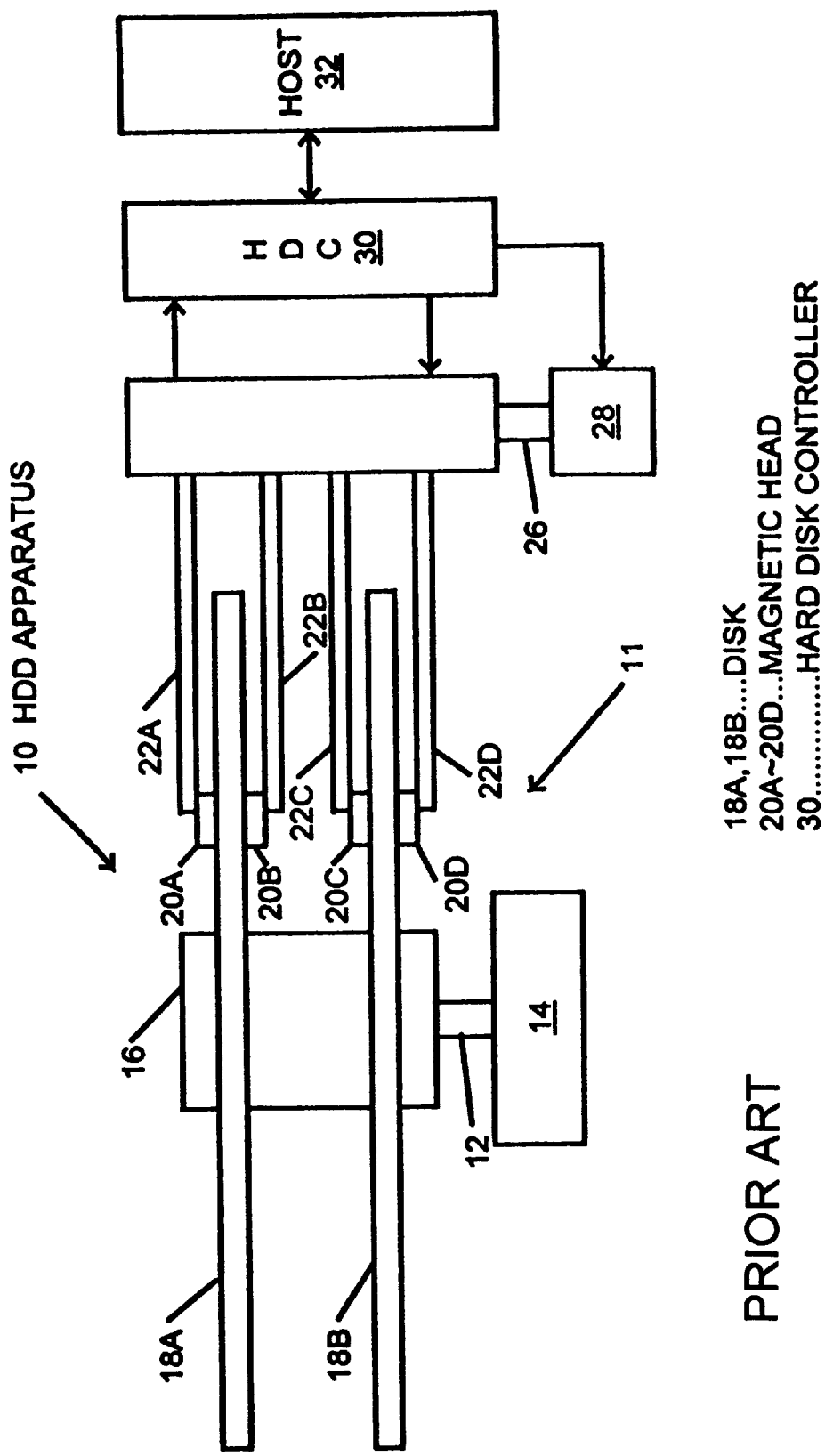
FIG. 1 is a schematic drawing of a disk drive apparatus according to one embodiment of the present invention.

FIG. 1 shows one example of a hard disk drive apparatus (HDD) 10 to which the present invention is applicable. As shown in FIG. 1, the HDD apparatus 10 comprises a disk section 11 and a hard disk controller (HDC) 30 provided with a local CPU. The disk section 11 is provided with a disk drive 14 for rotating a shaft 12 at high speed. A cylindrical support 16 is so attached on the shaft 12 that the axis lines coincide with each other, and one or more information recording disks 18A, 18B are attached on the peripheral surface of the support 16 at predetermined intervals. When the shaft 12 is rotated by the disk drive 14, the disks 18A and 18B are rotated in one unit with the support 16.

Opposed to the surface of each disk, a respective head slider 20A, 20B, 20C, 20D is placed on the support of an access arm 22A, 22B, 22C, 22D. Each access arm 22A, 22B, 22C, 22D is attached to the signal converter drive 28 through the shaft 26, by whose revolution the head slider 20 is positioned at a predetermined position of the disk. The disk drive 14 and signal converter drive 28 are connected to the HDC 30, whose rate of rotation, speed and the like are controlled. The HDC 30 can be connected to the host 32.

Figure 2:
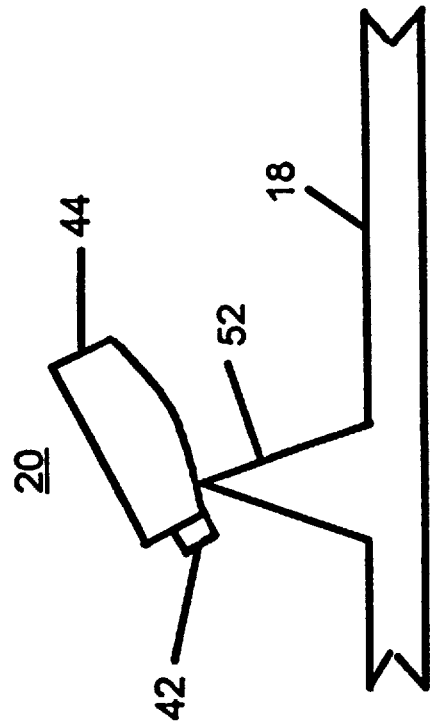
FIG. 2 is a operational drawing in a disk drive apparatus according to one embodiment of the present invention.

FIG. 2 is an explanatory drawing schematically sketching the manner that an asperity of the data recording surface on the disk touches at the projection of the signal converter in a disk apparatus according to the present invention, or more specifically showing a state that the head slider 20, on which the MR element 42 is loaded, touches at an asperity 52 on the disk 18 during data read on the disk 18. The head slider 20 comprises an MR element 42 and an Air Bearing Surface (ABS) 44. The head slider 20 slants to the rotational direction of the disk under action of a wind pressure accompanying the rotation of the disk and touches an asperity 52 on the disk 18 at the surface nearest to the disk of the ABS surface 44. In an ordinary signal read, contact of the MR element 42 or head slider 20 around MR element 42 with such asperities leads a rise in the temperature of the MR element and consequently a noise occurs.

Figure 3:
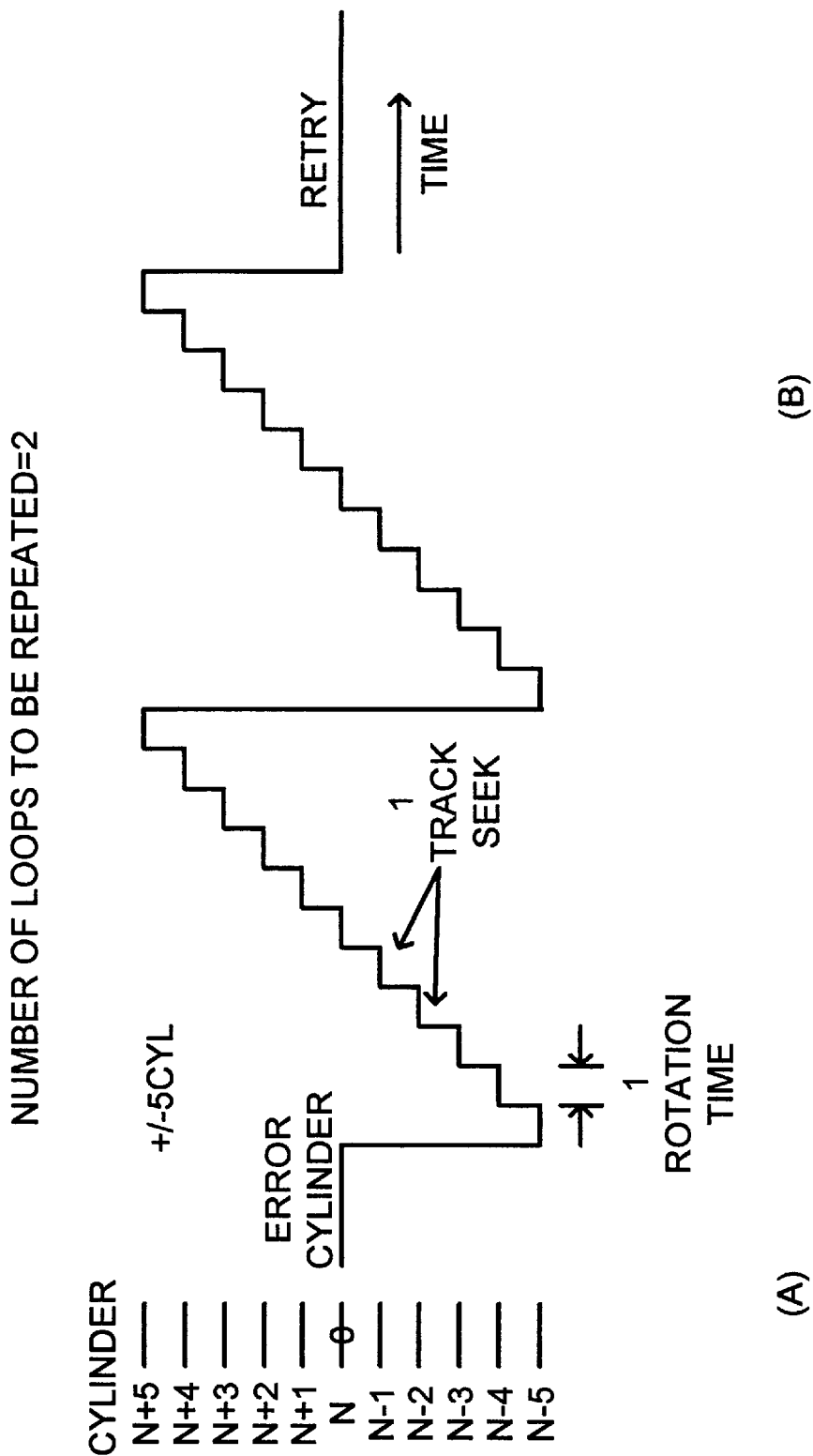
FIG. 3 is an explanatory drawing of the operation in a disk drive apparatus according to one embodiment of the present invention.

Referring to FIG. 3, there will be described how a unidirectional seek operation is actually executed in the present invention. FIG. 3 at (A) schematically sketches cylinders and an asperity 52 on the disk. For purpose of explanation, cylinder Nos. ranging from N+5 to N−5 are assigned to the respective cylinders. That is, a case where noise occurs by collision of the head 20 with an asperity 52 in the cylinder N will be described. Noise occurring at that time are obtained as a steepest read signal 62 as shown in FIG. 4A.

When occurrence of a steep noise peculiar to thermal asperities as seen from FIG. 3 (A) is detected in the cylinder N, a unidirectional seek operations according to the present invention is executed, for example, in such a manner as shown in FIG. 3 at (B). In FIG. 3 at (B), the elapse of time is indicated in the right direction and the cylinder positions of the disk are indicated in the vertical direction.

First, the MR head situated at the position where error occurred is moved to the cylinder position of N−5. Here, a unidirectional seek operation starts with the cylinder N−5. The MR head keeps waiting at the cylinder position N−5 for one turn of the disk. After one turn of the disk terminates, the MR head is moved to the cylinder position N−4 and keeps waiting above this cylinder position N−4 for one turn of the disk. This procedure is repeated in succession until the MR head reaches to the cylinder position N+5. This seek operation between the cylinder positions N−5 and N+5 is made one loop. When this one loop terminates, the MR head is again positioned at the cylinder position N−5, then a similar operation is executed to the cylinder N+5.

In an example shown by FIG. 3, the number of loop times is set to 2 and that of total seek cylinders is set to 11, extending to ±5 around. And, Start Cyl is set to N−5. After two loop repetition, seek operation terminates and a retry starts, i.e., a read operation is again executed to make sure whether a normal read operation is performed or not.

If the asperity 52 is removed by this seek operation, a read signal becomes normal and the error has been recovered, so that the procedure transits to a normal read or write operation. FIGS. 4A and 4B shows a read signal before and after the seek operation. The signal shown in FIG. 4A has a steeply changing point 62 due to thermal asperities, in which state a normal signal read is impossible. Herein, by executing the removal of thermal asperities, i.e., asperities in the unidirectional seek operation mentioned above, noises due to asperities disappeared as seen from FIG. 4B.

Incidentally, a MR-head mounted head component generally changes in floating height depending on the rate of rotation of the disk. That is, with lowering rate of rotation, the floating height decrease. For a more efficient execution of seek operation in the present invention, it is effective means to execute the seek operation by lowering the rate of rotation of the disk below a normal rate of rotation and decreasing the floating height of a head component, that is, securing a contact of the head 20 with asperities 52 in a closer move to the disk.

Figure 5:
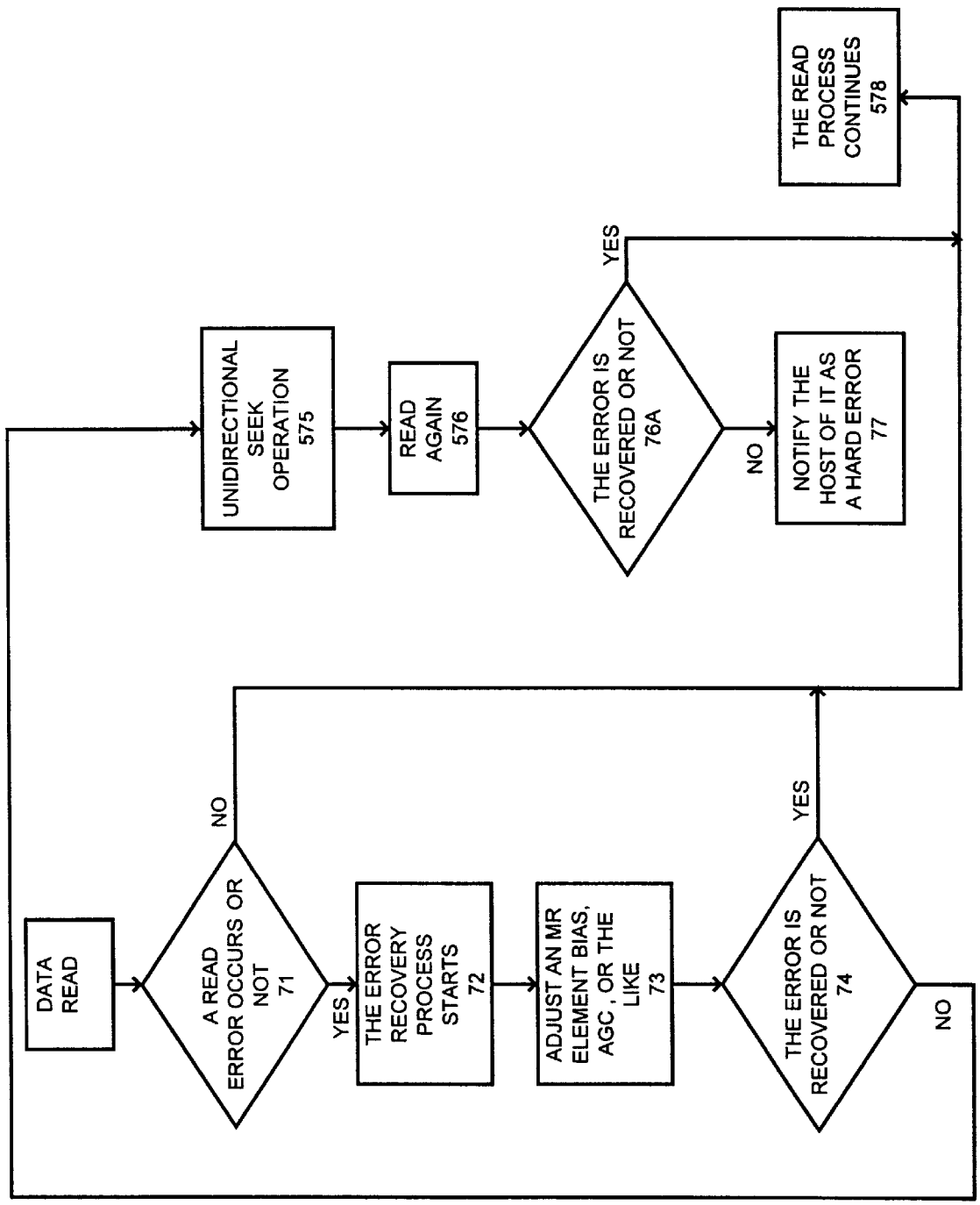
FIG. 5 is a flow chart showing a data recovery process according to one embodiment of the present invention.

Next, the data recovery operation for executing the removal of thermal asperities according to the present invention will be described by referring to the flow chart. FIG. 5 shows one example of flow to be executed in a case of detecting a read error during executing a normal read operation. After confirming the occurrence of a read error at the step 71, the error recovery process starts at the step 72. At the step 73, various conventional error recovery procedures, e.g., a modification in the bias current of the MR element or a gain control of the AGC, are executed. After various recovery procedures, a read operation is again executed, the flow goes out of the error recovery process routine at the time of a success in read operation (step 74) and returns to a normal read operation (step 78).

If the error is not recovered in these conventional error recovery steps, a unidirectional seek operation is executed at the step 75. Thereafter, at the step 76, data read is executed again. If the data read has success at step 76A, the error recovery process ends and the flow returns to a normal read operation (step 78). If the data read has failed also in this procedure at step 76A, the read error is notified as a hard error to the host (step 77). Then, for example, a replacement procedure, such as write into a substitutive region, or the like is performed. Incidentally, various error recovery procedures are not limited to this flow but the most frequent error in occurrence as a cause of errors may be subjected to recovery process at a preceding step.

FIG. 6 shows a sequence that the seek operation of the step 75 in FIG. 5 is actually executed. In a sequence shown in FIG. 6, seeks from the cylinder N−5 to the cylinder N+5 are repeated, and Start Cyl is set to N−5. In each cylinder, it is directed to wait for one rotation of the disk and proceed to the next cylinder.

Incidentally, though concrete numerical values are mentioned about the number of cylinders for executing a seek operation and the number of loops for seek in the description of each of the above embodiments, the present invention is not limited to these values.

While the present invention has been described with reference to the details of the embodiments of the invention shown in the drawing, these details are not intended to limit the scope of the invention as claimed in the appended claims.

what is claimed is:

1. A disk drive apparatus for rotating a disk signal recording medium and either reading a signal recorded in a track on said disk or recording a signal on said track by using a signal converter (head) floating above said disk, comprising:

means for detecting a read error of a data recording surface on said disk; said detected read error being attributable to a contact of said signal converter (head) with an asperity in a data recording surface on said disk; and means for executing a unidirectional seek operation relative to a position where said detected read error is located; said unidirectional seek operation including a predetermined number of the surrounding tracks relative to said position; said means for executing said unidirectional seek operation including means for moving said signal converter (head) to a starting track relative to said position; means for holding said signal converter (head) at said starting track for a time interval equal to at least one disk rotation; means for sequentially moving said signal converter (head) to a next track, and means for holding said signal converter (head) at said next track for said time interval, until said signal converter (head) reaches a last track relative to said position; said starting track and said last track being on opposite sides of said position; wherein a positive contact with said asperity on the disk by said signal converter (head) resulting from said unidirectional seek operation so that the asperity is scrubbed, thereby resolving the read error.

2. The disk drive apparatus as set forth in claim 1 wherein the means for executing said unidirectional seek operation including said predetermined number of surrounding tracks relative to said position is within +10 tracks to −10 tracks around the track where said read error has occurred.

3. A method for recovering a read error in a disk drive apparatus for rotating a disk signal recording medium and either reading a signal recorded in a track on said disk or recording a signal on said track by using a signal converter (head) floating above said disk, comprising the steps of:

detecting a read error of a data recording surface on said disk; said detected read error being attributable to a contact of said signal converter (head) with an asperity in a data recording surface on said disk; and executing a unidirectional seek operation relative to a position where said detected read error is located; said unidirectional seek operation including a predetermined number of the surrounding tracks relative to said position; said unidirectional seek operation including the steps of:

moving said signal converter (head) to a starting track relative to said position:

holding said signal converter (head) at said starting track for a time interval equal to at least one disk rotation;

sequentially moving said signal converter (head) to a next track and holding said signal converter (head) at said next track for said time interval, until said signal converter (head) reaches a last track relative to said position; said starting track and said last track being on opposite sides of said position;

wherein a positive contact with said asperity on the disk by said signal converter (head) resulting from said unidirectional seek operation so that the asperity is scrubbed, thereby eliminating the read error.

4. The method for recovering a read error in a disk drive apparatus as set forth in claim 3 wherein the means for executing said unidirectional seek operation including said predetermined number of surrounding tracks relative to said position is within +10 tracks to −10 tracks around the track where said read error has occurred.

5. A method for recovering a read error in a disk drive apparatus for rotating a disk signal recording medium and either reading a signal recorded in a track on said disk or recording a signal on said track by using a signal converter (head) floating above said disk, comprising the steps of:

detecting a read error of a data recording surface on said disk; said detected read error being attributable to a contact of said signal converter (head) with an asperity in a data recording surface on said disk;

moving said signal converter (head) to a starting track position equal to a predetermined offset from a particular track of said detected read error;

holding said signal converter (head) at said starting track position for a predefined duration;

moving said signal converter (head) in one direction to a next track position relative to said particular track of said detected read error;

holding said signal converter (head) at said next track position for said predefined duration;

repeating said steps of moving said signal converter (head) in said one direction to said next track position and holding said signal converter (head) at said next track position a selected number of times until said signal converter (head) reaches a last track position relative to said particular track of said detected read error; said starting track position and said last track position being on opposite sides of said particular track of said detected read error.

6. A method for recovering a read error in a disk drive apparatus as recited in claim 5 wherein said step of moving said signal converter (head) in one direction to said position equal to said predetermined offset from said particular track of said detected read error includes the step of moving said signal converter (head) in one direction to said position equal to a selected number of tracks offset from said particular track.

7. A method for recovering a read error in a disk drive apparatus as recited in claim 5 wherein said step of holding said signal converter (head) at said position for said predefined duration includes the step of holding said position for a time interval approximately equal to one disk rotation.

8. A method for recovering a read error in a disk drive apparatus as recited in claim 5 wherein said steps of moving said signal converter (head) in said one direction to said next position relative to said particular track of said detected read error includes the step of moving said signal converter (head) to an adjacent track position.

* * * * *